United States Patent [19]

Weinhold

[11] 4,027,698
[45] June 7, 1977

[54] VALVE WITH GENERALLY SPHERICAL CLOSURE MEMBER

[76] Inventor: Karl Weinhold, Im Jagdfeld 43, 4040 Neuss, Germany

[22] Filed: Jan. 6, 1975

[21] Appl. No.: 539,152

[30] Foreign Application Priority Data

Jan. 12, 1974 Germany .......................... 2401459
May 30, 1974 Germany .......................... 2426065

[52] U.S. Cl. ........................ 137/625.22; 251/315
[51] Int. Cl.² ........................................ F16K 11/02
[58] Field of Search ............... 137/625.21, 625.22, 137/625.23, 625.24; 251/315

[56] References Cited

UNITED STATES PATENTS

| | | | |
|---|---|---|---|
| 2,133,580 | 10/1938 | Searle | 137/625.22 X |
| 3,464,449 | 9/1969 | Morton | 137/625.24 |
| 3,557,832 | 1/1971 | Mueller et al. | 137/625.22 |
| 3,700,006 | 10/1972 | Marcillaud | 137/625.21 |
| 3,717,323 | 2/1973 | Geipel | 251/315 |
| 3,773,291 | 11/1973 | Grauer | 251/315 |

FOREIGN PATENTS OR APPLICATIONS

| | | | |
|---|---|---|---|
| 133,129 | 10/1951 | Sweden | 137/625.22 |
| 261,968 | 12/1926 | United Kingdom | 137/625.24 |

*Primary Examiner*—Arnold Rosenthal
*Attorney, Agent, or Firm*—Sherman & Shalloway

[57] ABSTRACT

A valve comprises a valve housing, a first bearing sleeve defining an inlet passage, a second bearing sleeve defining a main outlet passage and a third sleeve defining a secondary outlet passage, all in the valve housing, and a generally spherical valve closure member co-operating with the sleeves, having a passage therethrough for connecting the main outlet passage with the inlet passage in an open position of the valve in which the secondary outlet passage is closed and having a recess extending from the valve passage for connecting the main and secondary outlets when the valve is in a closed position.

14 Claims, 9 Drawing Figures

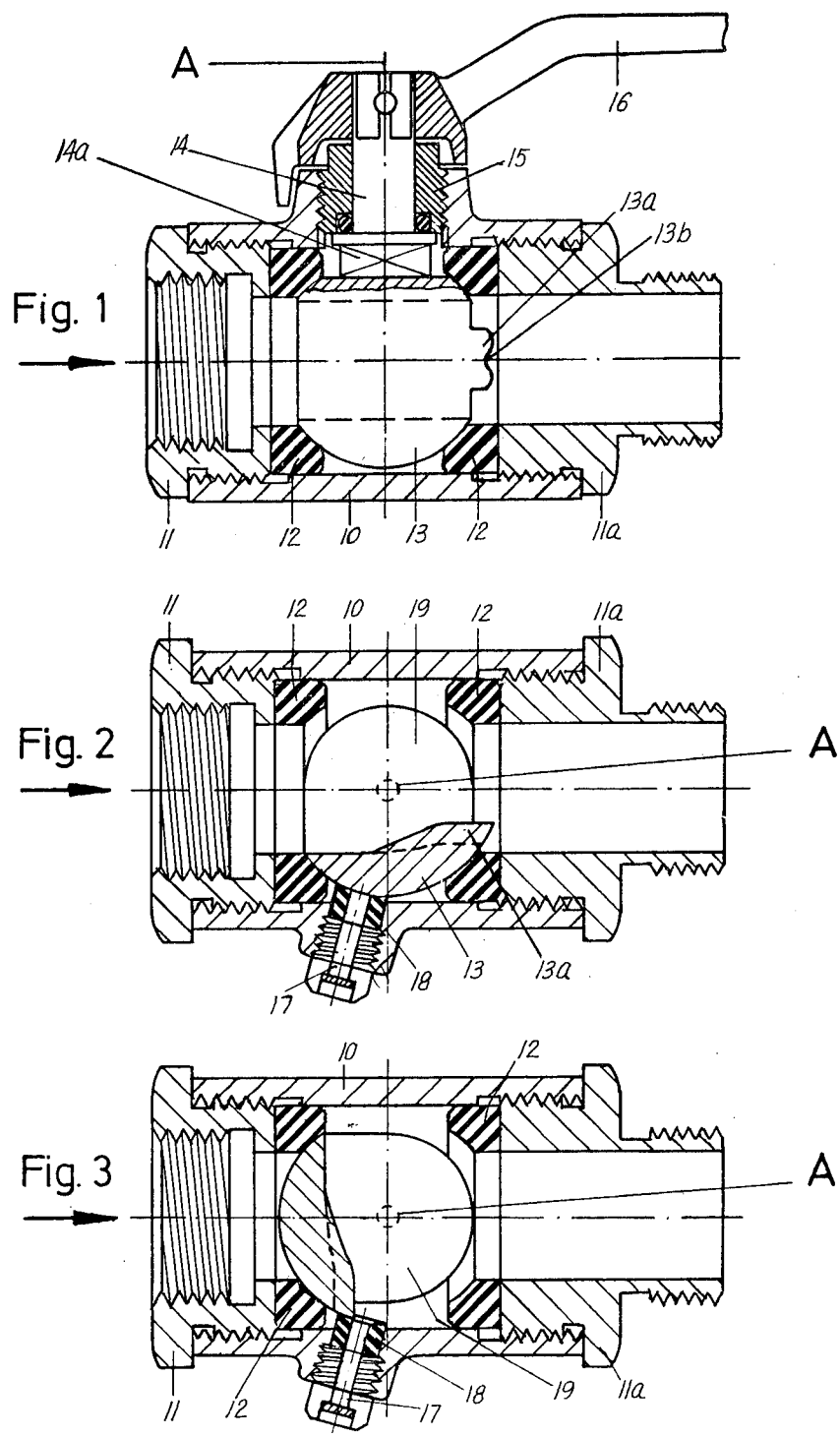

VALVE WITH GENERALLY SPHERICAL CLOSURE MEMBER

BACKGROUND OF THE INVENTION

The invention relates to a valve with a housing in which is arranged rotatably moveably between two bearing sleeves with bearing surfaces, which are, for example, shaped like segments of a sphere, a generally spherical closure part, and with a passage, passing through the closure part, for a liquid or gaseous medium.

In known valves of this type the closure part mostly has a complete spherical shape. The passage passing through the latter is formed by a bore leading through the centre point of the sphere, which bore runs radially to the axis of rotation. By rotation of the spherical closure part about this axis of rotation, the ends of the bore are brought into coincidence with the centre openings of the bearing sleeves, if the valve is to be opened. In the closed position the bore lies approximately at right-angles to the centre axis of the bearing sleeve arranged coaxially with respect to each other.

It is appropriate in many instances, e.g. to relieve in the disconnected state, a compressed air line connected to such a valve. If the valve is connected on the inlet side to a compressed air supply, thus, for example to a compressor, and a compressed air tool is connected to the outlet side of the valve, then it has to be taken into account after the shut off that the line leading from the valve to the compressed air tool is still under pressure. In this case it is at least dangerous to separate the compressed air tool from its line connection, since the pressure still prevalent in the line can suddenly force the connection ends apart immediately after the release of a coupling holding the latter together. This possibility is not taken into account in many instances when releasing the coupling. However, the pressure can also still be so large that the release of the coupling is made difficult or is made impossible.

In order to avoid these disadvantages and difficulties, it would be appropriate if, in the closed position of such a valve, a relief of pressure in the line leading to the compressed air load could also simultaneously take place. However, there is still no valve, with a spherical closure part with which such a relief is possible.

Indeed, it is known in the case of valves of different construction to achieve such a relief of pressure, that is to say in the case of a valve the closure member of which is constructed with a shape like a truncated cone. The tapered outer surfaces of this closure member abut at corresponding internal surfaces of the valve body, wherein between these surfaces a particularly accurate fit is necessary in order to achieve a sealing effect which is as good as possible. However, it is very difficult to achieve an absolute and reliable sealing effect in the case of these valves. This is primarily due to the particularly high requirements which are made of the production accuracy. In addition however, grooves or channels, which considerably reduce the sealing effect, are easily formed at the tapered sealing surfaces in the course of use. The grooves or channels again already result due to small foreign or dirt bodies, the penetration of which into the interior of the valve is mostly unavoidable.

As compared to this, valves of the type named at the outset with a generally spherical closure member can be very reliably sealed, since the bearing sleeves comprise material which is particularly suited herefor, the elasticity of which ensures every time a good abutment against the seal surfaces of the closure member.

SUMMARY OF THE INVENTION

It is an object of the invention to provide a valve having generally spherical closure member with the possibility of relieving the pressure in the output of the valve.

According to the invention there is provided a valve comprising a valve housing, a first bearing sleeve in said housing defining a valve inlet passage, a second bearing sleeve in said housing defining a main valve outlet passage, a third sleeve in said housing defining a secondary valve outlet passage and an approximately spherical rotatable valve closure member in said housing, cooperating with said first, second and third valves and defining a through passage extending through said valve closure member to provide communication between said valve inlet passage and said main valve outlet passage in an open position of said valve closure member in which said recording valve outlet passage is closed by said valve closure member and a recess extending from said through passage to provide communication between said main valve outlet passage and said secondary valve outlet passage in a closed position of said valve closure member.

BRIEF DESCRIPTION OF THE DRAWINGS

The invention will now be described in greater detail, by way of example, with reference to the drawings in which:

FIG. 1 shows a longitudinal section through a valve in a plane parallel to the axis of rotation of the closure part;

FIG. 2 shows another longitudinal section through the valve in a plane radial to the axis of rotation of the closure part and in the open position of the closure part;

FIG. 3 shows a section corresponding to the section according to FIG. 2, but in the closed position of the closure part;

DESCRIPTION OF THE PREFERRED EMBODIMENTS

Figure 4:
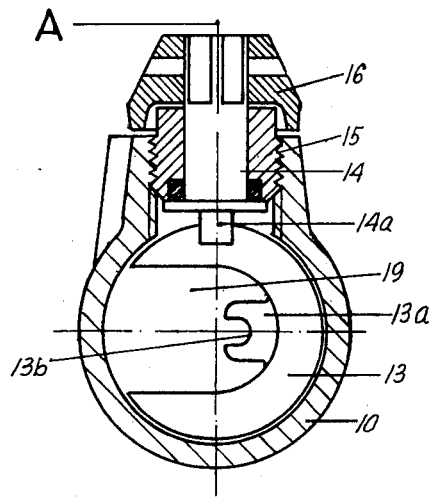
FIG. 4 shows a cross-section through the centre of the closure part.

Referring to the drawings, in the embodiment shown in FIGS. 1 to 4, a housing 10 of a valve is formed by a tubular member into both ends of which threaded ferrules 11 and 11a are screwed. The latter each push a bearing sleeve 12 having a convex spherical surface against a concave spherical closure part or plug 13. The closure part or plug 13 is rotatable about an axis A, that is to say by means of a lever shaft 14 which is guided in a bushing 15 screwed into the housing 10 and is provided at its upper end with a hand lever 16. A flat projection 14a which engages in a correspondingly dimensioned slot of the closure part 13 is located on the opposite end of the hand lever 16.

At the level of a radial diametral plane of the closure part 13, an outlet or vent opening 17 is provided in the housing 10, the bore of which outlet is in communication with the centre opening of an additional sleeve or sealing sleeve 18 at its inner end. The end of the sleeve 18 forms a concave entry generally in conformity with the spherical surface of the plug and the spherical surfaces of the bearing sleeves 12, so that there is a continuous spherical surface. The outlet 17 and the additional sleeve 18 are displaced by a predetermined angle relative to a plane passing through the centre of the closure part 13 and running parallel to the bearing sleeves 12 so that they approach the vicinity of the inlet side bearing sleeve 12.

The closure part or plug 13 has a cut-out 19 which has at its inlet end, in the open position of the closure part 13 according to FIG. 2, an approximately U-shaped cross-section, whereas at its end facing the valve outlet, it projects to either side of the axis of rotation A, to a greater extent in the closure part 13. By this there is formed in the part lying between these two deeper regions projection 13a extending in the radial direction which in turn is provided with a cut-out or groove 13b so that the projection 13a forms two projections surrounding this cut-out 13b. The cut-out 13b runs continuously in the form of a groove in the direction of the part, of the closure part 13 facing the input side in the closed position of the valve. The projection 13a can also cover with safety the additional sleeve 18 if, with the help of the deeper notches, such a form is given to the cut-out 19 in the region of the inlet side that, in the region of the centre opening of the input side bearing sleeve 12, a leading edge is not formed. In each case, the corresponding part of the inner edge of the cut-out 19 covers a part of the sealing surface of the additional sleeve 18 even in the pressure relief position of the valve so that the additional sleeve 18 is always well supported. In the case of the embodiment described here, this is effected in a particularly favourable manner by the projections formed next to the cut-out 13b.

The outlet side bearing sleeve 12 can comprise metal or plastics. A material which is particularly suitable for sealing purposes is used for the inlet side bearing sleeve 12, as the spherical outer sealing surfaces of the closure part 13 lie completely only against this material. The outlet side bearing sleeve 12 serves only as an abutment for the closure part 13 without taking part in the attainment of the sealing effect.

In the open position of the valve, the closure part 13 seals the additional sleeve 18 completely (FIG. 2), while the appropriate pressure medium can flow through the cut-out 19 unhindered. In the closed position according to FIG. 3, the closure part 13 releases the additional sleeve 18 and thus the outlet 17 so that pressure prevalent in a connected outgoing line can be reduced via this outlet.

Figure 5:
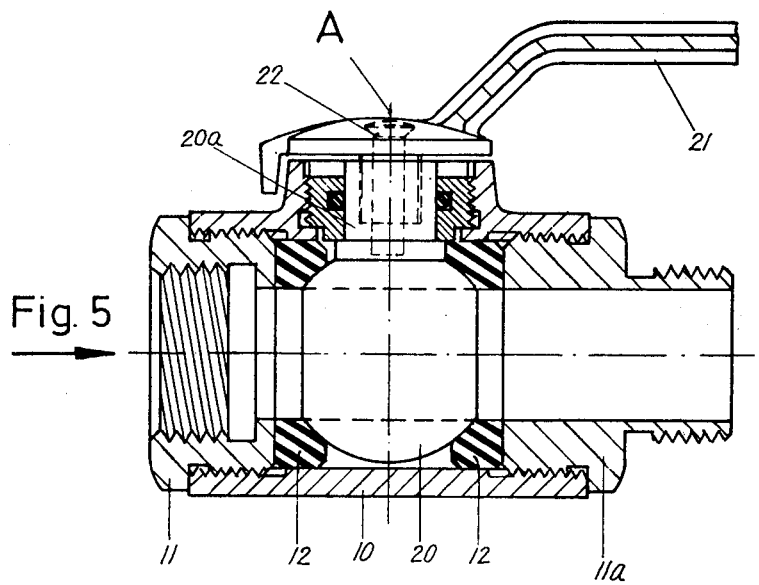
FIG. 5 shows a longitudinal section in a plane running parallel through the axis of rotation of the closure part in another embodiment of the valve.
Figure 6:
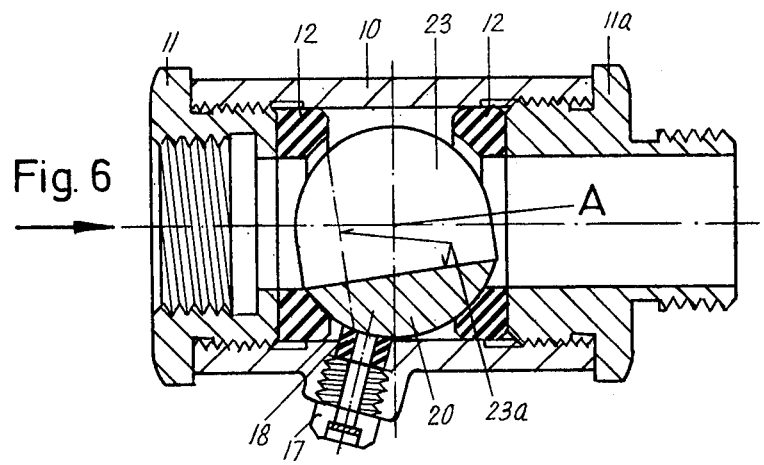
FIG. 6 shows another longitudinal section of the valve shown in FIG. 5 in a sectional plane radial to the axis of rotation of the closure part.

The following differences to the form of embodiment according to FIGS. 1 to 4 exist in the case of the form of embodiment shown in FIGS. 5 and 6.

A somewhat differently constructed closure part 20 is provided which is made in one piece with a lever shaft 20a serving for the attachment of the hand lever 21. The shaft 20a is provided with an internal square end in which a correspondingly shaped square end of the hand lever 21 engages. However, a simple fastening of the hand lever 21 with the help of a corresponding bolting is also conceivable. In the present case, the removal of the hand lever 21 is prevented by means of a bolt 22.

Further, the cut-out 23 of the closure part 20 is shaped somewhat differently. At the level of a radial diametral plane of the closure part 20 there results a cross-section, which has the shape of a segment of a circle, formed by a chord 23a of the same circle, which in the open position of the valve forms, with an axis running through the centre of the two bearing sleeves 12, an angle opening towards the inlet side.

FIG. 6 shows that the closure part 20 in the region of the inlet side bearing sleeve 12 no leading edge opposes the inflowing medium.

Additionally, the position of the closure part 20 in the closed position of the valve is indicated with dotted lines 23b in FIG. 6 in which position the additional sleeve 18 is released.

Figure 7:
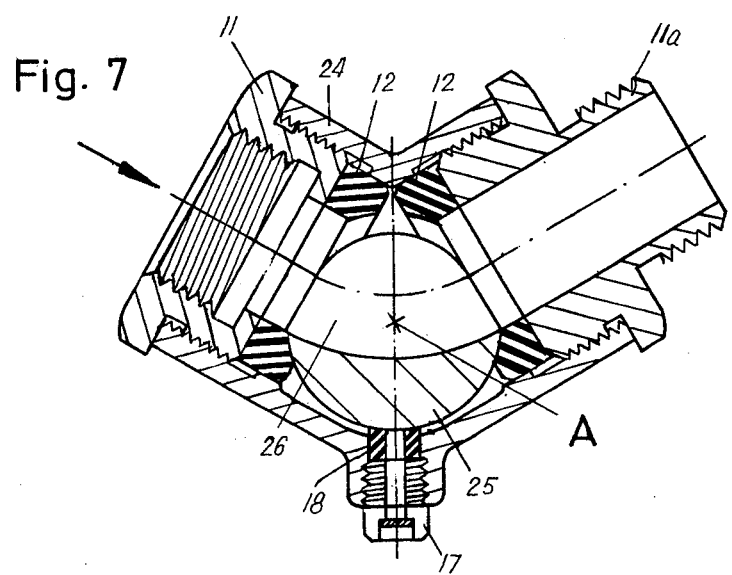
FIG. 7 shows a longitudinal section in a plane radial to the axis of rotation of the closure part in a third embodiment of the valve in the open position of the closure part.
Figure 8:
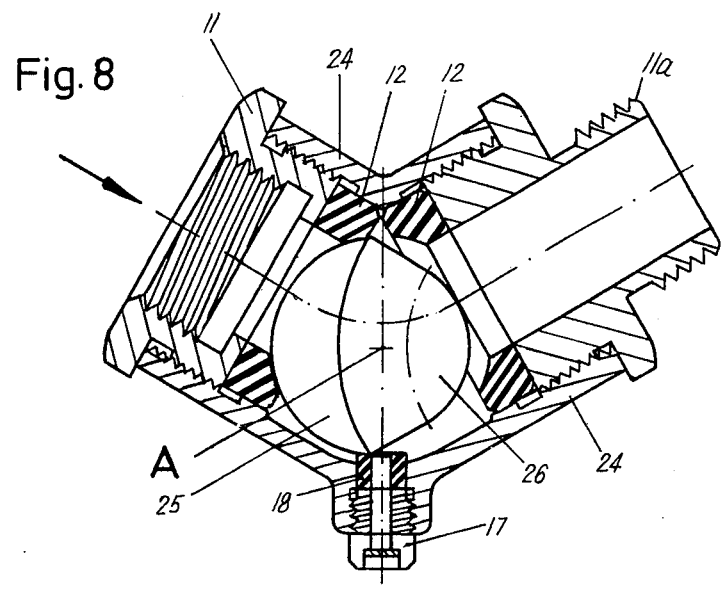
FIG. 8 shows a section corresponding to the section according to FIG. 7, but in the closed position of the closure part.

In the case of the form of embodiment shown in FIGS. 7 and 8, the threaded ferrules 11 and the bearing sleeves 12 are inserted in an angular housing 24 which likewise has a substantially circular internal cross-section. The centre axes of the bearing sleeves 12 form in this case an angle of approximately 120°. The axis of the additional sleeve 18 and of the outlet 17, which is inserted in the wall of the housing 24, likewise at the level of a radial diameter of the closure part 25, is located on the bisectrix of this angle with the same angular spacing to the said axes.

The closure part 25 has, in this case, a cut-out 26 which, at the level of the diametral plane radial to the axis of rotation A, has a cross-section which is similar to a segment of a circle, wherein also the wall limiting the cut-out 26 has the shape of a part of an arc of a circle, the radius of which is greater than the actual spherical radius of the closure part 25. As FIG. 7 shows, in the open position of the valve an almost continuous deflection of the medium flowing therethrough is achieved by this without any leading edges whatever opposing the flow. There are no longer any flow breaking up edges even at the outlet side of the closure part 25.

Here too, with the closure part 25 in the closed position of the valve it forces the additional sleeve 18 and the outlet 17 so that a relief of pressure in the outgoing line takes place. The additional sleeve 18 is sealed in the open position of the valve.

If, for example, the outlet 17 and the additional sleeve 18 were displaced, in the case of the embodiment of FIGS. 7 and 8, a little towards the inlet side bearing sleeve 12, then it is obvious that in the depicted position of the closure part 25, the additional sleeve 18 could still be sealed. It can be further seen that the closure part 25 can be rotated a little further in a clockwise direction to a second closure position. Then the additional sleeve 18 can remain sealed optionally in a first closure position and the release of pressure be effected only by rotation of the closure part 25 into the second closed position.

Figure 9:
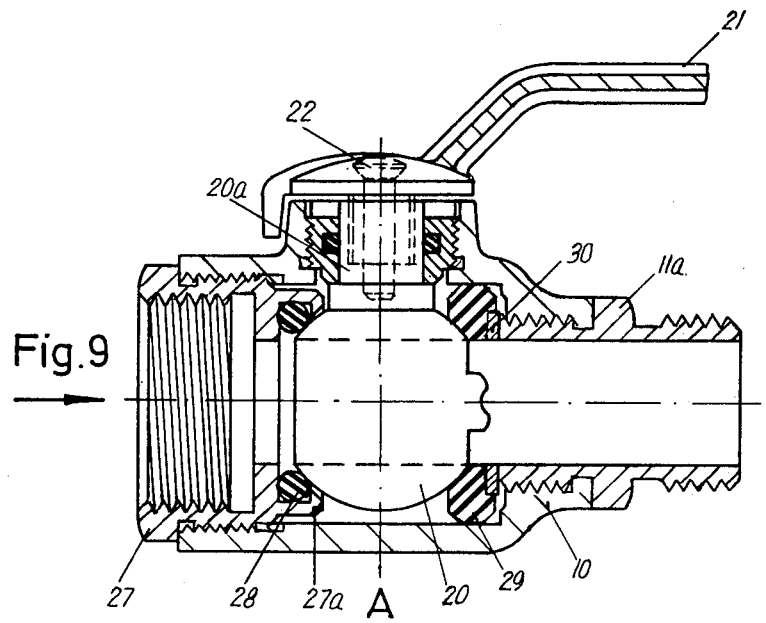
FIG. 9 shows a longitudinal section through another embodiment of the valve.

In the case of the embodiment shown in FIG. 9, there is, relative to the embodiment according to FIG. 5 and FIG. 6, a change insofar as here a threaded ferrule 27 is screwed into the housing 10 on the inlet side, which ferrule is provided at its side facing the closure part 20 with an annular edge 27a holding and engaging over an annular seal 28. This edge forms, together with the annular seal 28, the inlet side bearing sleeve, wherein the annular seal 28 is provided, for adaptation to the shape of the closure part 20, with corresponding spherical bearing surfaces and comprises the already mentioned special sealing material.

On the other hand, a bearing sleeve 29 is provided at the outlet side, which bearing sleeve comprises plastics and abuts on an annular plate 30, which is pressed through the outlet side threaded ferrule 11a in the direction of the closure part 20.

It will be understood that the above description of the present invention is susceptible to various modifications, changes and adaptations, and is to be limited only by the following appended claims.

What is claimed is:
1. A valve including:
   an inlet for letting fluid into the valve;
   an outlet for letting fluid out of the valve;
   a housing connecting the inlet to the outlet;
   a plug for selectively closing the inlet, said plug having a portion with a convex spherical surface area thereon and rotating about an axis extending through said housing between an open and closed position, wherein said axis passes through the center of curvature of said spherical surface;
   means for defining at least one concave spherical sealing surface within said housing, wherein said convex spherical surface has the same center of curvature, as said convex spherical surface area of said plug, and wherein said concave and convex spherical surfaces cooperate to close said inlet, when said plug is rotated to said closed position;
   a U-shaped cut-out extending through said plug, and defining an opening adjacent to said convex spherical surface for registering said inlet with outlet, when said plug is rotated to said open position, said U-shaped cut-out extending radially with respect to said axis;
   a vent opening for venting said outlet and extending through said housing, said opening having a sealing sleeve therein with an entry surface thereon having a concave spherical surface which conforms to and engages the convex spherical surface of the plug, when the plug is in the open position;
   said convex spherical surface area of said plug being sufficiently large to said inlet opening, when said plug is rotated to the closed position and sufficiently limited to uncover said vent when said plug is rotated to the closed position; and
   a projection extending up from the bottom of the "U-shaped" cut-out, wherein said projection has a groove therein extending normal to the axis of rotation of the plug, said groove registering with said vent opening, and said projection engaging the concave entry of said sleeve positioned in said opening, when said convex spherical surface closes said inlet opening.

2. A valve, as defined in claim 1, wherein said U-shaped cut-out is defined by edges, which are approximately aligned with said valve inlet when said plug is in said open position.

3. A valve, as defined in claim 1, wherein said plug has a lever shaft intergral therewith extending with the axis of rotation of said plug and out of said valve housing.

4. A valve, as defined in claim 1, wherein said plug has two closed positions so that said plug opens communication between said outlet and said vent opening in one of said two closed positions of said closure member and closes communication between said outlet and vent opening in the other of said closed positions.

5. A valve, as defined in claim 1, wherein said plug has an edge adjacent to said cut-out which covers part of a sealing surface of said sealing sleeve and supports said sealing sleeve thereby.

6. A valve, as defined in claim 1 wherein the groove has a depth which decreases as the groove extends into the plug.

7. The valve of claim 1, further including first and second rings, one of which is aligned with and disposed adjacent said inlet, and the other of which is aligned with and is disposed adjacent said outlet, wherein said ring disposed adjacent said inlet has said concave spherical sealing surface thereon, and wherein said vent opening is disposed between said rings.

8. A valve, as defined in claim 7, wherein said plug has a cross-section in a plane extending radially to the axis of rotation thereof in the form of a segment of a circle defined at one edge by a chord inclined relative to an axis running through the centre of said first and second rings to have a greater spacing from said axis towards said first ring when said valve closure member is in said open position.

9. A valve, as defined in claim 7, wherein said valve housing comprises a substantially cylindrical tubular member having an inner diameter corresponding to the outer diameter of said first and second rings and including two ferrules, each of which are screwed into a tubular end of said valve housing and abutting an associated one of said first and second rings.

10. A valve, as defined in claim 7, wherein said first and second rings have axes inclined to each other at an angle other than 180° with said vent opening arranged in the region of the periphery of said closure member at which the arcuate spacing between said first and second rings is at a maximum.

11. A valve, as defined in claim 10, wherein said first ring, and vent opening lie at an angle of 120° relative to one another.

12. A valve, as defined in claim 10, wherein said plug has a cross-section in a diametral plane extending radial to the axis of rotation of said plug in the form of a segment of a circle delimited on its inner edge by an arc of a further circle.

13. A valve, as defined in claim 7, wherein said second ring is made of metal.

14. A valve, as defined in claim 7, wherein said second ring is made of plastic.

* * * * *